United States Patent [19]

Stewart

[11] Patent Number: 4,592,072
[45] Date of Patent: * May 27, 1986

[54] DECODER FOR SELF-CLOCKING SERIAL DATA COMMUNICATIONS

[76] Inventor: Robert E. Stewart, One No Name Rd., Stow, Mass. 01775

[*] Notice: The portion of the term of this patent subsequent to May 22, 2001 has been disclaimed.

[21] Appl. No.: 578,883

[22] Filed: Feb. 10, 1984

Related U.S. Application Data

[63] Continuation of Ser. No. 376,069, May 7, 1982, Pat. No. 4,450,572.

[51] Int. Cl.$^4$ .............................................. H03K 13/24
[52] U.S. Cl. ........................................ 375/55; 375/82; 375/87; 375/110; 360/42; 329/104
[58] Field of Search .................... 375/87, 110, 55, 80, 375/82, 49, 94; 360/40, 42, 44, 48, 51; 329/104; 340/347 DD

[56] References Cited

U.S. PATENT DOCUMENTS

| | | | |
|---|---|---|---|
| 4,167,760 | 9/1979 | Decker | 360/43 |
| 4,450,572 | 5/1984 | Stewart et al. | 375/87 |
| 4,475,212 | 10/1984 | McLean et al. | 375/17 |

Primary Examiner—Marc E. Bookbinder
Assistant Examiner—Raymond C. Glenny

[57] ABSTRACT

Apparatus for decoding a self-clocking, encoded signal wherein a series of data bits is encoded such that for each data bit, the encoded signal contains a first transition, and, for each data bit for which the succeeding data bit has the same binary value, the encoded signal contains a second transition occurring within a predetermined time interval after the first transition. The decoding apparatus comprises storage means responsive to a clocking signal of at least a predetermined minimum pulse width, received at a clock input for storing a sample of a digital signal received at a data input, the storage means having at least one output indicative of the stored value; an exclusive-OR gate; a first signal path from the output of the storage means through the exclusive-OR gate to the clock input of the storage means; a second signal path from the source of the encoded signal through the exclusive-OR gate to the clock input of the storage means; and a third signal path from the source of the encoded signal to the data input of the storage means; the time for a signal to propagate along the first signal path being at least as long as the minimum pulse width required to clock the storage means; and the difference between the time for a signal to propagate along the second signal path and the time for a signal to propagate along the third signal path being at least as long as said predetermined time interval.

1 Claim, 8 Drawing Figures

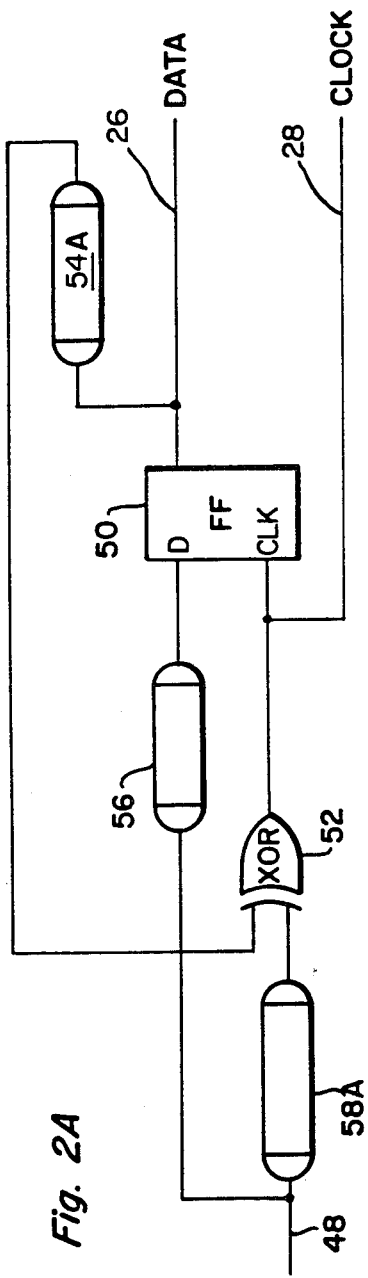
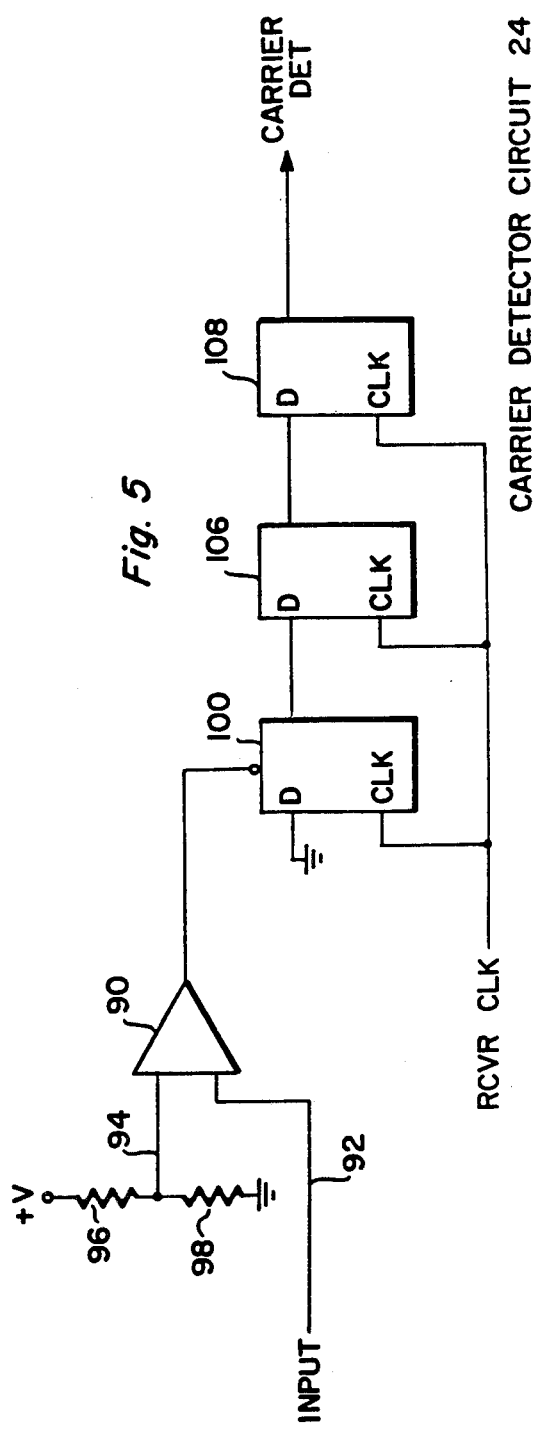

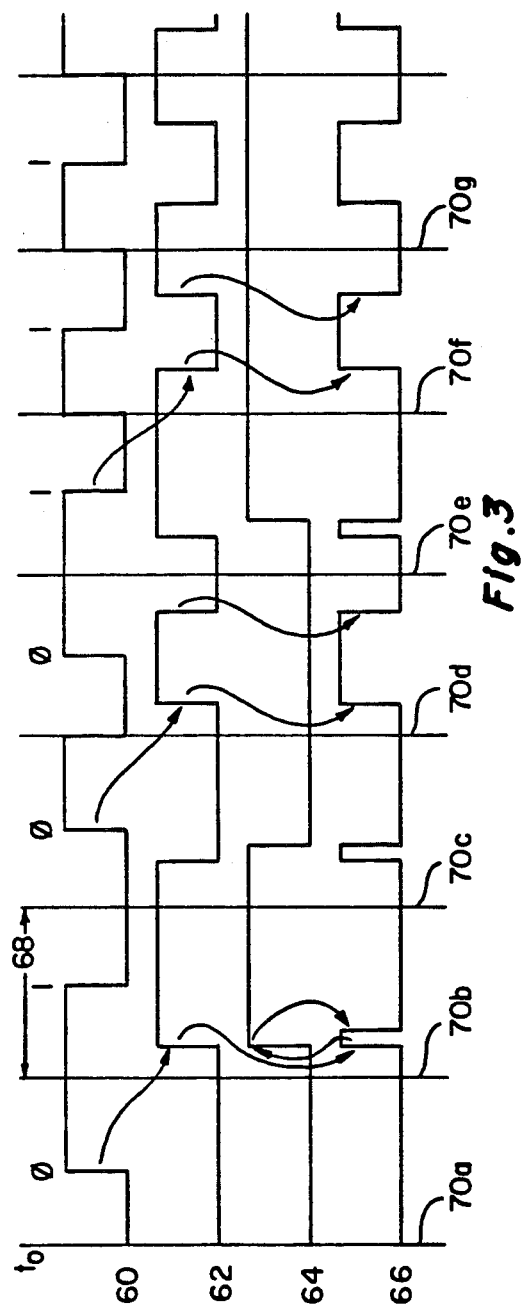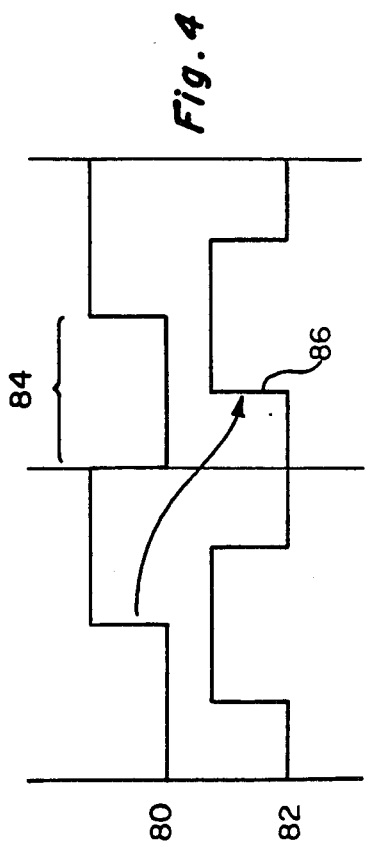

DECODER FOR SELF-CLOCKING SERIAL DATA COMMUNICATIONS

This is a continuation of application Ser. No. 376,069 filed May 7, 1982, U.S. Pat. No. 4,450,572, patented May 22, 1984.

FIELD OF THE INVENTION

This invention relates to data processing systems, and more specifically, to a digital data communication system useful for decoding and transferring information among devices of a digital data processing system using serial communications therebetween, wherein clock and data signals are combined, such as with so-called Manchester-type encoding.

BACKGROUND OF THE INVENTION

Various techniques exist for synchronous, bit-serial digital communications. Because both clock and data are sent over the same communications channel in such systems, particular attention must be (and is) given to protecting the integrity of the signal thus conveyed.

One such technique is known in the art as Manchester encoding. To produce Manchester encoded data, representations of digital data bits and a clocking signal are combined together for transmission as but one common information signal which may be sent over a single serial data channel. Frequently, a coaxial cable constitutes the transmission medium of the information channel. A decoder, coupled to the information channel at the receiver, separates the data bits and clocking signals from the composite signal, whereby the data bits, under control of the clocking signals extracted thereby, are transferred to the device which is coupled to the decoder. With most coding schemes, more difficulties lie with decoding operations than with encoding operations, and Manchester-type encoding follows this general rule. See, for example, U.S. Pat. Nos. 4,167,760 and 4,317,211. This invention, too, is directed to the provision of an efficient Manchester-type decoder.

However, this invention is directed in particular to the problems encountered when Manchester or other self-clocking encoding is used for serial transmission over a carrier-sense multiple access (CSMA) channel. Since, in a communications system employing Manchester-type codes, the timing signals needed for controlling the transfer of data bits at the receiving end are derived both from clocking signals transmitted by a transmitting device (i.e., they must be extracted from the data channel) and from an internal clock source in the receiving device, some means must be provided to synchronize the two clocks. (It is presumed the transmitting device operates asynchronously and independently from the receiving device.) Furthermore, the external clocking signals transmitted by the transmitting device may become corrupted by, for example, noise or a collision of signals on the channel due to two or more transmitting devices attempting simultaneously to transmit information. It is desirable, therefore, to prevent collisions or other corruptive influences from interfering with internal timing operations.

Further, as with any digital data communication system, it is desired to attain as high a rate as possible of data transfers, keeping within the cost and timing contraints imposed by available circuit components. It is an object of this invention to provide for very high speed serial transfers without incurring exhorbitant circuitry costs. Prior art systems which might use, for example, a phase-locking loop circuit for controlling the Manchester decoding operations are both costly and relatively slow in locking onto information signals transmitted at rates of, say, 70 megabits per second or more.

A further objective of this invention is to provide an interface for coupling a computer with a data communications link that permits asynchronous bit-serial communications among devices transmitting and receiving Manchester-type codes over a serial information channel.

Another objective of this invention is to provide an economical and efficient Manchester decoder useful for decoding high-speed bit-serial information transmitted over a serial communications link that is shared by several devices connected thereto.

Another objective of this invention is to provide means in the interface for detecting the presence of a carrier signal on the serial data channel.

Yet another objective of the present invention is to provide means for synchronizing an internal clock source with an external clock source derived from a Manchester encoded signal transmitted by another device, with means for preventing collisions from interfering therewith.

SUMMARY OF THE INVENTION

To attain these and other objectives, at the receiving end of at least one serial data channel to which a receiving device connects, this invention provides simple but highly efficient and effective receiving interface circuitry for such a link. The interface circuitry comprises and centers around a decoder for connecting to the channel and separating from the composite signal on the channel the component data bits and clocking signals; a carrier detector, also adapted for connecting to the channel and for detecting the presence of information on the channel, and in response thereto, for enabling a serial shift register to receive serially the transmitted data bits in response to the clocking signals; and an internal clock synchronizer for synchronizing the occurrences of parallel transfers of data bits to the receiving device with the occurrence of a predetermined number of serial data bits at the beginning of the transfer of serial data from the channel.

The decoder is elegant in its simplicity. It employs a flip-flop, an exclusive-OR gate, and a minimum of two delay elements. the delays cause the flip flop to sample the composite signal about one-quarter way through each bit cell.

The carrier detector is also quite simple. The bus signal is compared against a preset threshold. If the bus signal exceeds the threshold, a pulse train is generated. The pulses set a latch. The trailing edge of a lower frequency internal clock causes the latch to clear if the bus signal vanishes.

An internal clock is provided, independently of the clock derived from received data. One time at the beginning of each message, the synchronization character is detected in the incoming message, and the phase of the internal clock circuit is corrected. It is this clock which controls the transfers from the interface to a host device.

Other objectives, advantages and features of the invention will become apparent upon review of the succeeding description of an illustrative embodiment taken in connection with the accompanying drawings. The invention, however, is pointed out with particularity in, and limited only by, the appended claims.

BRIEF DESCRIPTION OF THE DRAWINGS

FIG. 2A is a schematic circuit diagram of one embodiment of a decoder according to the present invention;depicted in FIG. 1; of the present invention;

FIGS. 3 and 4 are timing diagrams illustrating the operation of the decoder of FIG. 2A;

FIG. 5 is a circuit diagram of the carrier detector circuit depicted in FIG. 1;

DESCRIPTION OF AN ILLUSTRATIVE EMBODIMENT

Figure 1:
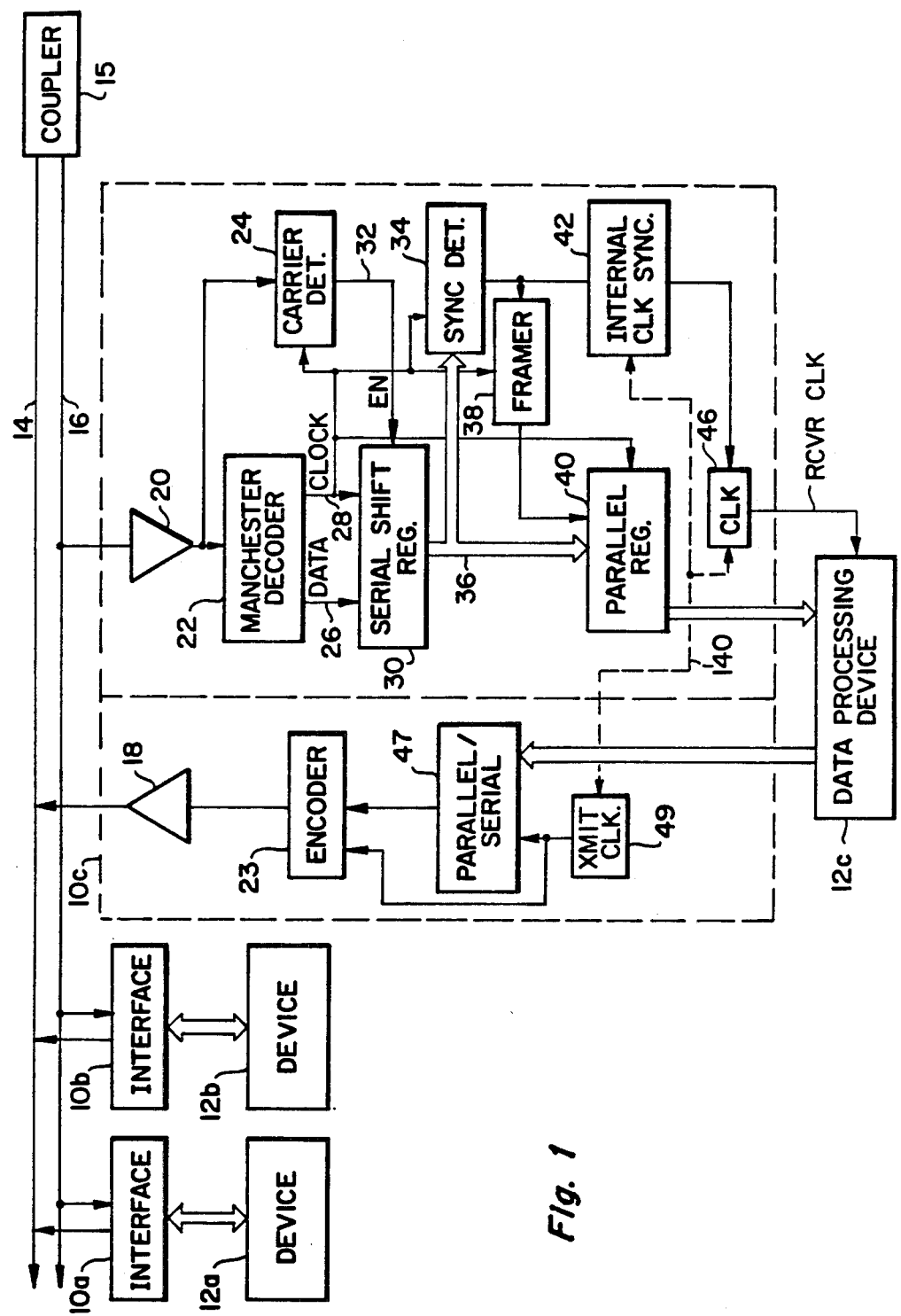
FIG. 1 depicts a communications channel to which several devices of a data processing system connect through the interface network of the present invention, shown in block diagram form.

FIG. 1 depicts a communications link and interface including a transmitting channel 14 and a receiving channel 16 over which a plurality of devices 12a, 12b and 12c connect via their respective interfaces 10a, 10b and 10c. Information on the transmitting and receiving channels 14 and 16 are coupled by a coupler 15 which enables devices on the channel 16 to sense information signal transmitted on the channel 14. In a data processing system, a device 12a includes at least a processor and memory, and may be a computer system, input/output device on secondary memory such as a controller and disk or tape storage device, for example, which transmits or receives data in parallel.

As this invention is concerned with a system for decoding Manchester-encoded or other suitably-encoded self-clocking serial data and transferring the decoded data to a parallel device, we show in interface 10c, an expanded block diagram of the interface circuitry in which a driver 20 (e.g., amplifier) receives from the receiving channel 16 signals representing serial data bits are clock transitions and supplies these signals to a Manchester decoder 22. As is well known, Manchester-encoded data comprises data bits and clock transitions combined in the same information signal. The decoder 22, being subsequently described, extracts the data signal (herein called data bits) and a clock (i.e., CLOCK) signal from the information signals on the channel 16 and supplies both the data bits and the CLOCK signal to a serial shift register 30 via conductors 26 and 28, repectively. The data bits are applied to the input of the first stage of the register 30 while the CLOCK signal serially shifts of the data bits into the successive stages thereof.

In order to determine whether valid information signals are present on the receiving channel 16, a carrier detector circuit 24 also receives information from driver 20. The circuit 24 tests, in a unique manner, the character of the information signals and, under certain conditons subsequently described in detail, produces an EN (i.e., enabling) signal on conductor 32, which enables the serial shift register 30 so that it receives and shifts the serial data bits from the data line 26. In essence, the carrier detector circuit 24 prevents noise signals which might appear on the channel 16 from entering the register 30.

At periodic instances of time during the transmission of the serial data, a predetermined number of data bits (i.e., a byte) is transferred from the serial register 30 to the parallel register 40. In our preferred embodiment, eight data bits constitute a byte. Thus, the byte rate is one-eighth the bit rate. As each set of eight data bits accumulates in the serial register 30, a byte is transferred under control of a framer 38, also subsequently described, which enables the loading of the parallel register 40 associated with the serial register 30. The framer 38 effects a transfer of a byte to the parallel register 40 at a time instance that is coincident with the shift of a serial data bit into the serial register 30. The parallel register 40 then periodically transfers these bytes to the device 12c under control of an internal receiver clock 46. The receiver clock is controlled by the crystal oscillator circuit.

As previously mentioned, a problem solved by this invention is the synchronizing of the transfer of the bytes from the register 40 to the device 12c (this transfer is controlled by the internal clock 46) with the transfer of the individual data bits from the channel 16 to the register 30 (this transfer is controlled by the CLOCK signal pulses extracted from the channel 16). Since it is possible that two or more of the devices 12 may simultaneously attempt to transmit information signals and thus corrupt the CLOCK signal, it is not possible to rely on the CLOCK signal to run the device 12c; otherwise, the parallel transfers could become fouled in this case.

To overcome this problem, an internal clock synchronizing circuit 42 is provided. This circuit runs freely and is synchronized with the CLOCK signal pulses when a synchronization detector circuit 34 detects a unique synchronizing character at the beginning of the serial data stream. When the synchronizing character is detected, it momentarily stalls the internal receiver clock 46 if it is out-of-sync with, in this case, the periodic occurrences of eight CLOCK signal pulses, to adjust the phase of the internal clock 46. Therefore, complete isolation is achieved between the operation of the internal receiver clock 46 and the clocking signals extracted from the receive channel 16. This permits each of the devices 12 coupled to the communications link to operate asynchronously and independently—i.e., under control of its own separate clocking circuit.

Upon transmitting information from a device 12, a parallel-to-serial register 47 receives eight-bit bytes from the device 12c under control of a clock located therein, and when the signals representing the byte settle in the register 47, a clock 49 effects a shift on a serial basis of the data bits constituting the byte to the encoder 23. The encoder 23 combines representations of the data bits with clocking signals from the clock 49 to produce Manchester encoded information signals. These information signals are then applied to driver 18 which places the encoded information signals on the transmitting channel 14 where they are distributed by the passive coupler 15 to the other devices connected to the communicating link.

With this basic understanding of the foregoing aspects of the invention, the Manchester decoder 22 is now described. Refer to the circuit of FIG. 2A and the timing diagrams of FIGS. 3 and 4. A typical encoded information signal 60 from the receiving channel 16 (FIG. 1) enters the Manchester decoder over a conductor 48 and data and clocking signals leave the decoder via conductors 26 and 28, respectively. As shown by the information signal 60, a "zero" data bit is represented by a positive transition at the midpoint of the bit cell and a "one" data bit is represented by a negative transition at the midpoint of the bit cell. Bit cell 68, for example, contains a "one" data bit.

The Manchester decoder essentially comprises a flip-flop 50, an exclusive-or gate 52, and delay lines 54A and 58A. The delay line 56 provides a delay comparable to the exclusive-or gate 52, being provided so that the time difference between the occurrence of pulses in the information signals at the "D" and "CLK" inputs of the flip-flop 50 is primarily determined by the delay line 58A, rather than by the delay through gate 52 which varies to some extent among circuit components. In practice, an exclusive-OR gate on the same logic chip as the gate 52 may constitute the delay line 56.

With that understanding, the Manchester encoded signal 60 appears at the "D" input of flip-flop 50. To begin operations in the decoder, all data transmissions must be preceeded by a "zero-to-one" bit transition and the flip-flop 50 is clocked during the first half of each bit cell thereby to transfer the logical status of the bit cell to the data line 26. For example, if a "one" is detected, it appears on the data line 26. Likewise, if a "zero" is detected, it too appears on the data line 26. The latter half of each bit cell could be sampled, as well; but if so, the logical status of the data bits would be inverted.

To extract the clocking signal from the sampling flip-flop 50 of the decoder, a clocking signal 66 is derived by "exclusive-OR'ing" in gate 52 the delayed Manchester encoded signal 62 (at the output of delay line 58A) with the delayed flip-flop output signal 64 (at the output of delay line 54A). The encoded data is sampled by the flip-flop 50 on positive excursions of the signal 66. The exclusive-OR gate 52 then provides the pulses of the signal 66 to the "CLK" input of the flip-flop, and the width of the pulses is determined by the amount of delay provided by delay line 54A. On the other hand, the amount of delay provided by delay line 58A is established so that, as more clearly shown in FIG. 4, the time instances of a mid-cell transition 86 on the flip-flop "CLK" line occur at the midpoint of the first half period 84 of the next cell time. In this fashion, the bit cells are most likely to be sampled at a time instance that more reliably passes a representation of the data bit through the flip-flop 50 to the data line 26, even when there is a slight phase shift in the incoming information signal. As the flip-flop 50 is clocked on the positive-going edges of the pulses of the signal 66, the width of the pulses thereof do not affect the sampling operations except that they must be compatible with the circuitry used. As mentioned with reference to FIG. 1, the output of the flip-flop 50 and the clocking signal from the gate 52 couple the serial shift register 30.

Note further that, a transition from "zero" to "one", or from "one" to "zero", in the serial bit stream causes a pulse to be generated in signal 66. A series of consecutive "zeroes" causes the delayed Manchester signal to appear in the bit cell of signal 66 and a series of "ones" causes the delayed Manchester signal to appear, but inverted. Thus, the nature and characteristics of the encoded signal also can be derived from this information.

Figure 2B:
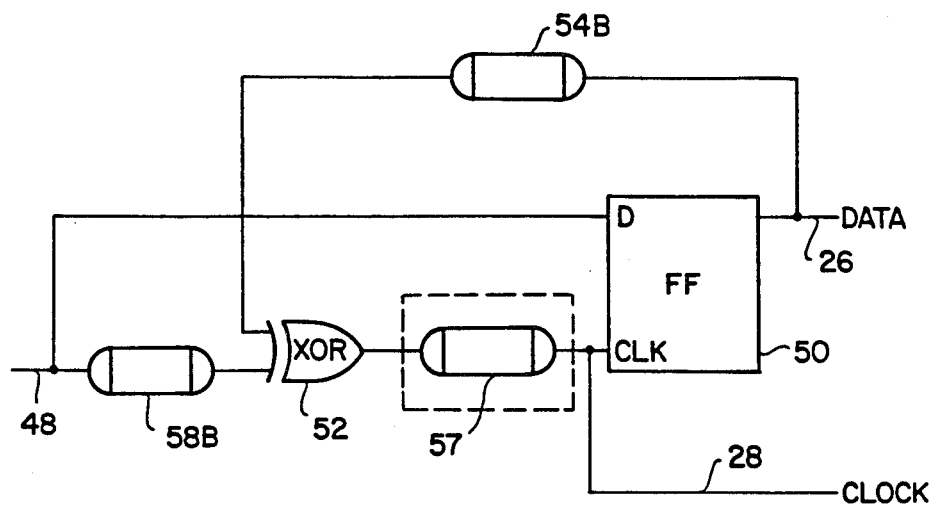
FIG. 2B is a schematic circuit diagram of another embodiment of a decoder according to the invention.

It will be understood by those skilled in the art that operation according to the same principles can be provided by locating delays in other positions within a circuit of comparable topology. For example, as FIG. 2B shows, part of the required delay may, if desired, be placed between the output of exclusive or gate 52 and the clock input of flip-flop 50. Operation as described above is obtained so long as: (1) the sum of the delays through the combination of delay lines 54B and 57 and exclusive-OR gate 52 is greater than the minimum clock pulse width required by flip-flop 50 and less than one bit cell duration minus the required flip-flop clock pulse width, and (2) the sum of the delays through the combination of delay lines 58B and 57 and exclusive-OR gate 52 is approximately equal to three-fourths ($\frac{3}{4}$) the bit cell interval. These restrictions may be satisfied with delay 57 or 54B equal to zero, of course, so only two delay elements are needed, as a minimum. Indeed, if the propagation through the flip-flop and exclusive-OR gate take long enough, so that a clock pulse of sufficient width can be provided, delay line 54B can be omitted.

As should now be apparent, the above described Manchester decoder is simple, efficient, capable of high speed operation, needs very little "lock-acquisition" time, and is very reliable in that it can tolerate rather large excursions in phase shift (e.g. almost one-fourth of a bit cell time). In the preferred embodiment, using inexpensive conventional circuit components decoding has been achieved at rates as high as seventy to one hundred megabits per second without losing the clock edge and yet still discriminating between the clocking and data signals.

The carrier detector circuit 24 (FIG. 1) is shown in FIG. 5 and is provided for enabling the serial shift register 30 to shift data from data line 26 into the several stages thereof. In effect, the carrier detector circuit 24 indicates that valid data and clocking signals are present on the data and clock lines 26 and 28, respectively, so as to reject noise signals which might enter the receiver channel 16. A series of alternating "ones" or "zeros" preceeds an information transmission over the receive channel. To sense valid data, the circuit 24 employs a comparator 90 for comparing the level of the signals emanating from the driver 20 and appearing at input 92 of the comparator with a threshold level applied at comparator input 94 from a voltage divider network comprising resistors 96 and 98. Following a valid bit information transmission, the comparator 90 generates a pulse each time an information signal exceeds the threshold voltage level established by the voltage divider network 96 and 98, thereby to set a data flip-flop 100. A clock signal from an internal clock source (e.g., 46) includes a divide-by-eight counter 102 which produces clocking signals at, in the preferred embodiment, one-eighth of the rate of the information signals; this is referred to as the RCVR CLK signal. It clocks flip-flops 100, 106 and 108. Being that the rate of the information signals is at least 35 MHz, at least two information pulses are assured to occur between each occurrence of a RCVR CLK pulse.

If a valid information signal (i.e., one exceeding the carrier detect threshold) is present on the information channel, flip-flop 100 will be set and, upon the occurrence of each RCVR CLK pulse, flip-flop 108 becomes set and flip-flop 100 is cleared. Thus, so long as a carrier signal is present, flip-flop 100 always appears to be set when sampled by flip-flop 106. After two RCVR CLK pulses, flip-flop 108 becomes set thereby to assert a CARRIER DET signal which enables the serial shift register 30. If, on the other hand, valid information signals are not present at the input 92, the flip-flop 100 is not set, but is instead cleared by the RCVR CLK signal in that its data input is tied to ground. When the contents of flip-flop 100 is sampled by the flip-flop 106, a "zero" appears. After two occurrences of the RCVR CLK pulse, both flip-flops 106 and 108 are cleared and the CARRIER DET signal becomes deasserted.

Figure 6:
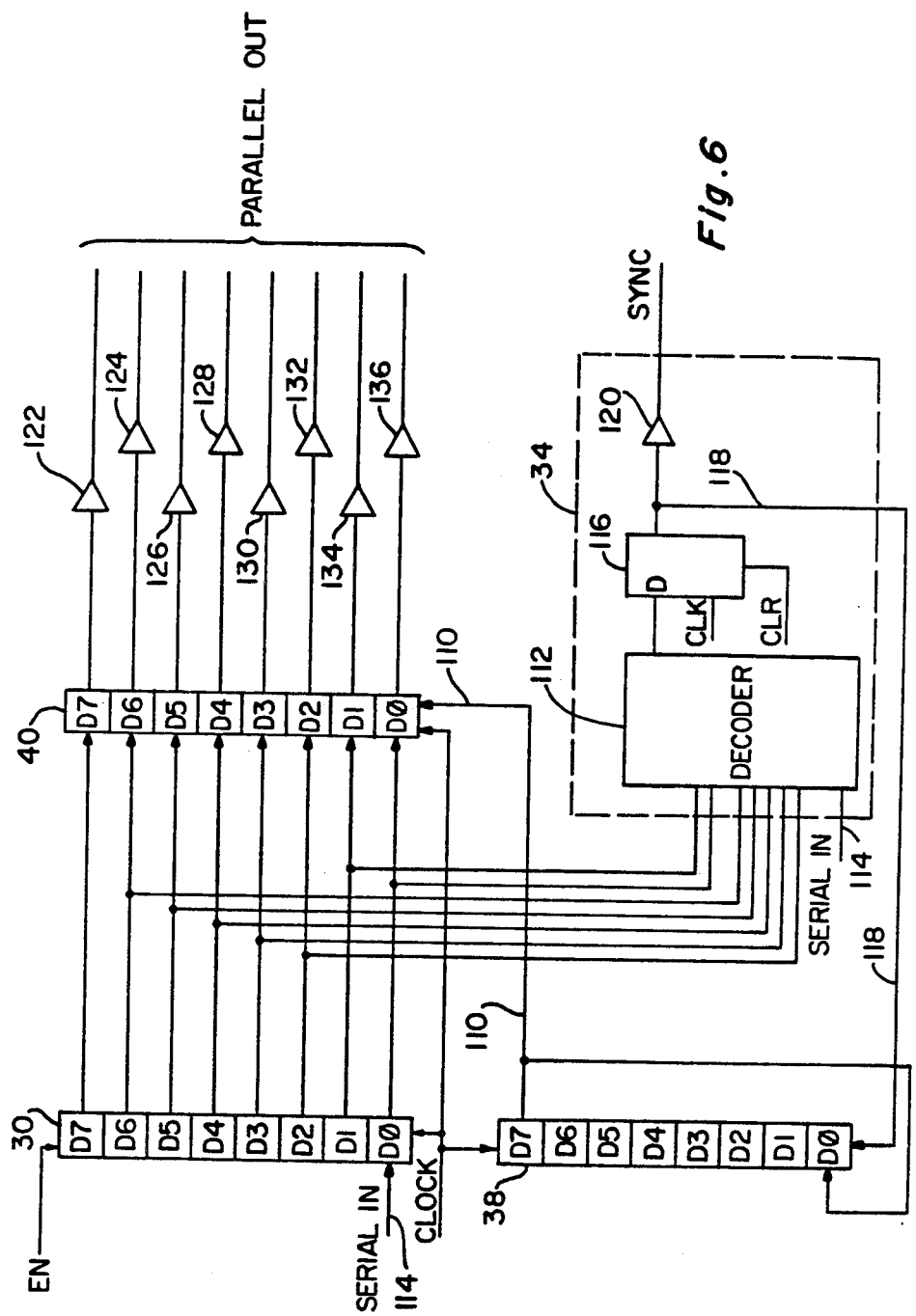
FIG. 6 is a circuit diagram of the serial shift register, parallel shift register, framer, and synchronizing character detector depicted in FIG. 1.

FIG. 6 shows, in greater detail, the circuits 30, 34, 38 and 40 of FIG. 1 for detecting the synchronizing character and for converting serial data to parallel data. The serial shift register 30 receives serial data at its input stage D0 under control of the CLK signal from the Manchester decoder 22. Initially, the parallel register 40 is held in load mode by a signal applied on conductor 110, which represents the status of the D7 stage of the framer 38. Until the synchronization character is detected, the framer 38 is held in the above-described condition and the parallel register 40 is held in load mode. However, when the synchronizing character is present in the serial data stream, a decoder 112 detects a unique combination of eight data bits, constituted by the data bits present in stages D0–D6 of the serial shift register 30 and the next serial-in data bit appearing at input 114 of the decoder 112. On the next CLK signal pulse, the decoder 112 asserts an output signal at the "D" input of a flip-flop 116 which, in turn, asserts a signal on conductor 118 and driver 120. The driver 120 generates the SYNC signal for the internal clock synchronizer 42, its operation being subsequently explained.

As a result of the assertion of flip-flop 116, a "one" signal begins to circulate in the framer 38 under control on the CLK signal pulser. Before the interface is started, the "one" is constantly loaded into the D7 position in the framer 38 and the other stages are cleared. Eight CLK signal pulses later, the "one" signal which was initially loaded into the D7 stage of framer 38 again appears at the D7 stage whereupon a signal becomes asserted on the conductor 110 thereby to enable the parallel register 40 to load. Upon the occurrence of the next CLK signal, the eight data bits which followed the synchronizing character now reside in the serial shift register 30 and then are shifted, in parallel, to the parallel register 40. The "one" signal in the D7 stage of the register 38 passes to the D0 stage thereof via conductor 110 and the "zero" in the D6 stage passes to the D7 stage, which thus disables the parallel register 40. The occurrence of every eight CLK signal pulses causes the "one" signal to be recirculated into the D7 stage of framer 38, thereby to effect parallel tranfers of eight-bit bytes from the serial register 30 to the parallel register 40. Each bit of the byte in the D0-D7 stages of the parallel register 40 is then driven by drivers 122-136 onto a parallel bus of the receiving device in the data processing system.

Figure 7:
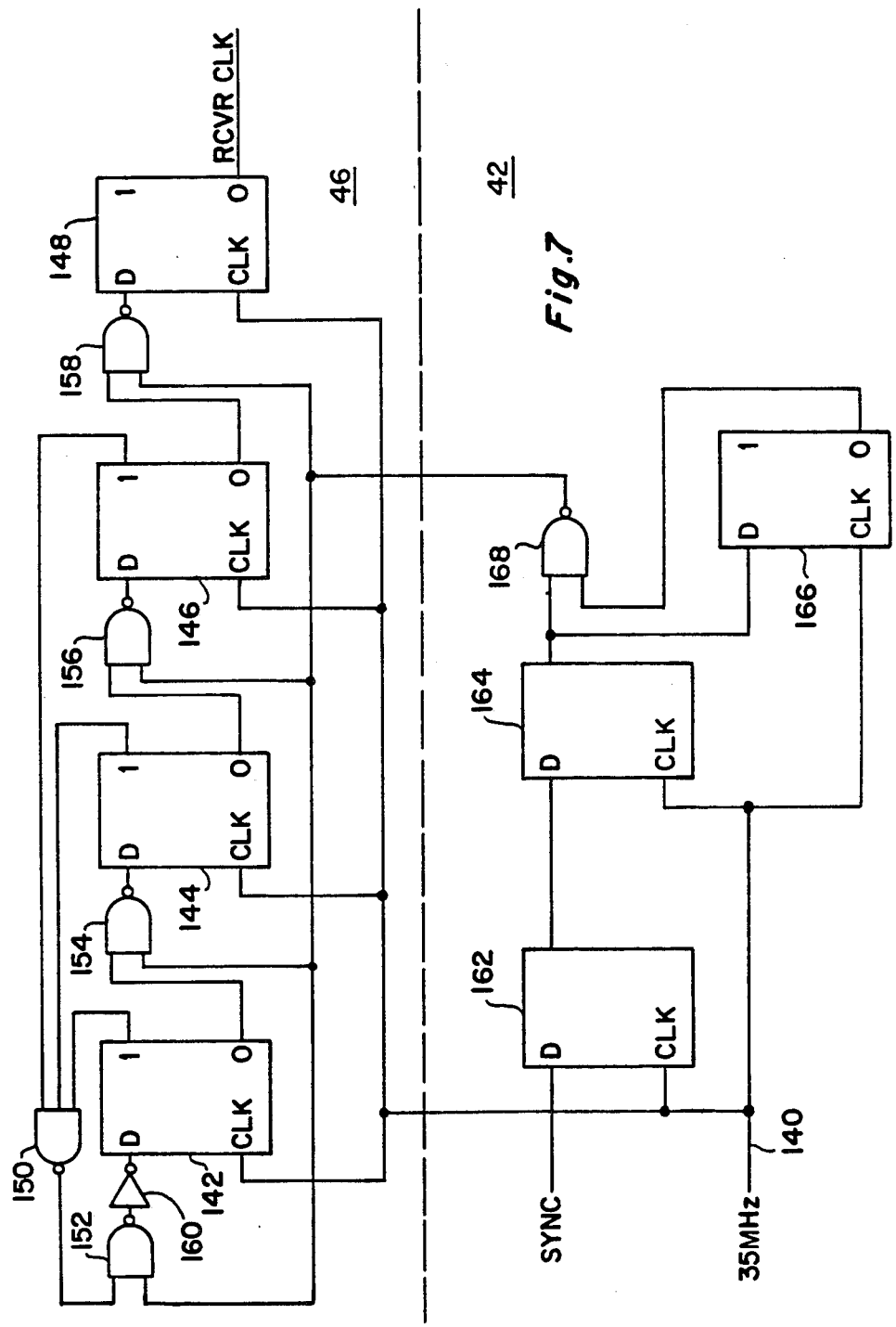
FIG. 7 is a circuit diagram of the internal clock and synchronizing circuit depicted in FIG. 1.

FIG. 7 depicts a preferred circuit implementation for the internal clock synchronizing circuit 42 of FIG. 1. As shown, the circuit 42 receives clock pulses from the internal 35 MHz oscillator at an input 140. The 35 MHz clock signals clock each stage of a divide-by-four counter constituted by latches 142, 144, 146 and 148. At time periods other than the clock synchronization period (164 set, 166 clear) the output of gate 168 is held at a "one" state. Thus, one input of each of nand gates 152, 154, 156 and 158 is enabled, which permits the contents of each stage 142, 144, 146 to be shifted to a succeeding stage. The last stage 148 produces the RCVR CLK signal.

Upon the occurrence of every fourth cycle of the 35 MHz clock oscillator, the output state of latch 148 sets to the "0" state, thereby to generate the assertion of the RCVR CLK signal. Latch 148 is returned to the "1" state on the next cycle of the 35 MHz clock. In the feedback network, the nand gate 150 couples the output stages of latches 142, 144 and 146 which, when each contains a "one" state, for example, energizes the nand 150. When so energized, "zero" is placed in the latch 142 on the next cycle of the 35 MHz clock oscillator. With the "zero" in latch 142, nand gate 150 become deenergized, thereby to return the input of latch 142 to "one", but the "zero" is instead passed to the next latch 144 as the nand gate 154 becomes energized. As the 35 MHz clock cycles progress, the "zero" propagates to the latch 148, to produce the RCVR CLK pulse thereat; and the state of each of the latches 142, 144 and 146 returns to a "one" state. Afterwards, another "zero" momentarily appears at the input of latch 142 for one period of the 35 MHz oscillator.

When the detector 34 (FIG. 1) detects the synchronizing character in the serial data stream, the SYNC signal is asserted at the input of the latch 162 at one cycle thereafter (see FIG. 6, latch 116). After two cycles after assertion of the SYNC signal at latch 162, nand gate 168 becomes engergized by the high level output of latch 164 and the low level output of latch 166. Nand gate 168 remains energized for one cycle of the 35 MHz clock oscillator. When so energized, each of the nand gates 152, 154, 156 and 158 becomes deenergized, thereby to recycle the divide-by-four counter constituted by the latches 142, 144, 146 and 148. Recycling places a logical "one" into stages 142, 144, and 146 of the counter, and a "zero" into the latch 142 upon the occurrence of the next clock period of the 35 MHz clock oscillator. If the RCVR CLK signal were already in phase with the SYNC signal, then the "zero" in latch 142 would in effect be shifted to latch 148 as if it were a normal recycling of the counter.

The resynchronization of the internal clock circuit is implemented so as to guarantee a minimum of one byte clock period during resynchronization thus avoiding the creation of logic race conditions due to the occurrence of a short cycle. The receiver clock period may be increased from one to one and three-quarters byte times in duration in one quarter byte increments during the resynchronization period.

The above illustrative embodiment depicts a circuit arrangement for interfacing a device to a serial data communicating link in a data processing system. It can, however, be used for any type of serial data communicating link over which clocking signals are transmitted to a device also having its own internal clock which requires isolation from the external clocking signals, whether or not these external clocking signals are extracted from Manchester-type encoded information. Each component of the system being exemplary, we do not intend to limit the scope of our invention to the specific embodiments shown or described, but instead, we intend the scope of our invention to encompass those modifications and variations as may be apparent to those persons skilled in the art to which the subject matter pertains.

We claim:

1. Apparatus for decoding to an NRZ signal an encoded signal received from a signal source, the encoded signal encoding a series of data bits with, for each data bit, a first transition in the encoded signal, and for each data bit for which the succeeding data bit has the same binary value, a second transition occurring within a predetermined time interval after the first transition, said apparatus comprising:

A. storage means responsive to a clocking signal of at least a predetermined minimum pulse width, received at a clock input of the storage means, for storing a sample of a digital signal received at a data input of the storage means, the storage means having at least one output indicative of the value of the stored sample, an output of the storage mjeans providing the decoded NRZ signal, B. an exclusive-OR gate, C. a first signal path from an output of the storage means through the exclusive-OR gate to the clock input of the storage means, D. a second signal path from the source of the encoded signal through the exclusive-OR gate to the clock input of the storage means, and E. a third signal path from the source of the encoded signal to the data input of the storage means, wherein a. the time for a signal to propagate along the first signal path is at least as long as the minimum pulse width required to clock the storage means, and b. wherein the difference between the time for a signal to propagate along the second signal path and the time for a signal to propagate along the third signal path is at least as long as said predetermined time interval, and c. the output signal from the exclusive-OR gate comprises a signal which has exactly one pulse for each data bit.

* * * * *

UNITED STATES PATENT AND TRADEMARK OFFICE
CERTIFICATE OF CORRECTION

PATENT NO. : 4,592,072

DATED : May 27, 1986

INVENTOR(S) : Robert E. Stewart

It is certified that error appears in the above-identified patent and that said Letters Patent is hereby corrected as shown below:

Cover Page, add   Assignee:  Digital Equipment Corporation
                             Maynard, Mass.

Cover Page, add   Attorney, Agent, or Firm -- Cesari and McKenna

Signed and Sealed this
Twentieth Day of January, 1987

Attest:

DONALD J. QUIGG

Attesting Officer

Commissioner of Patents and Trademarks

REEXAMINATION CERTIFICATE (2216th)
United States Patent [19]
Stewart

[11] B1 4,592,072
[45] Certificate Issued * Feb. 15, 1994

[54] DECODER FOR SELF-CLOCKING SERIAL DATA COMMUNICATIONS

[75] Inventor: Robert E. Stewart, Stow, Mass.

[73] Assignee: Digital Equipment Corporation, Maynard, Mass.

Reexamination Request:
No. 90/002,968, Feb. 24, 1993

Reexamination Certificate for:
Patent No.: 4,592,072
Issued: May 27, 1986
Appl. No.: 578,883
Filed: Feb. 10, 1984

[*] Notice: The portion of the term of this patent subsequent to May 22, 2001 has been disclaimed.

Certificate of Correction issued Jan. 20, 1987.

Related U.S. Application Data

[62] Division of Ser. No. 376,069, May 7, 1982, Pat. No. 4,450,572.

[51] Int. Cl.⁵ .............................................. H04L 27/10
[52] U.S. Cl. .............................. 375/55; 375/82; 375/87; 375/110; 360/42; 329/311
[58] Field of Search ...................... 375/55, 87, 110; 360/40, 42, 43, 44, 51; 341/70, 72

[56] References Cited

U.S. PATENT DOCUMENTS

| | | | |
|---|---|---|---|
| 3,804,982 | 4/1974 | Brown | 178/69 |
| 3,882,390 | 5/1975 | Lucas | 324/158 R |
| 4,063,220 | 12/1977 | Metcalfe et al. | 340/147 |
| 4,167,760 | 9/1979 | Decker | 360/40 |
| 4,317,211 | 2/1982 | Quesnell, Jr. | 375/87 |
| 4,475,212 | 10/1984 | McLean et al. | 375/17 |

FOREIGN PATENT DOCUMENTS

| | | |
|---|---|---|
| 48-53581 | 5/1973 | Japan . |
| 48-130412 | 11/1973 | Japan . |
| 50-50171 | 4/1975 | Japan . |
| PCT/US80/-01527 | 11/1980 | PCT Int'l Appl. . |

OTHER PUBLICATIONS

Alike, Peter, Electric Design News, "Exclusive-OR Gates simplify modem designs," 17, Sep. 15, 1972, p. 119.

*Primary Examiner*—Stephen Chin

[57] ABSTRACT

Apparatus for decoding a self-clocking, encoded signal wherein a series of data bits is encoded such that for each data bit, the encoded signal contains a first transition, and, for each data bit for which the succeeding data bit has the same binary value, the encoded signal contains a second transistion occurring within a predetermined time interval after the first transition. The decoding apparatus comprises storage means responsive to a clocking signal of at least a predetermined minimum pulse width, received at a clock input for storing a sample of a digital signal received at a data input, the storage means having at least one output indicative of the stored value; an exclusive-OR gate; a first signal path from the output of the storage means through the exclusive-OR gate to the clock input of the storage means; a second signal path from the source of the encoded signal through the exclusive-OR gate to the clock input of the storage means; and a third signal path from the source of the encoded signal to the data input of the storage means; the time for a signal to propagate along the first signal path being at least as long as the minimum pulse width required to clock the storage means; and the difference between the time for a signal to propagate along the second signal path and the time for a signal to propagate along the third signal path being at least as long as said predetermined time interval.

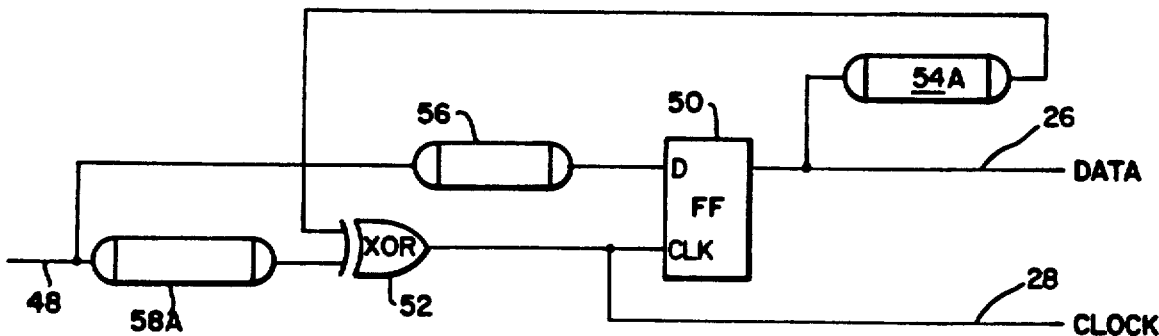

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

1. Apparatus for decoding to an NRZ signal an encoded signal received from a signal source, the encoded signal encoding a series of data bits with, for each data bit, a first transition in the encoded signal, and for each data bit for which the succeeding data bit has the same binary value, a second transition occurring within a predetermined time interval after the first transition, said apparatus comprising:
  A. storage means responsive to a clocking signal of at least a predetermined minimum pulse width, received at a clock input of the storage means, for storing a sample of a digital signal received at a data input of the storage means, the storage means having at least one output indicative of the value of the stored sample, an output of the storage [mjeans] *means* providing the decoded NRZ signal,
  B. an exclusive-OR gate,
  C. a first signal path from an output of the storage means through the exclusive-OR gate to the clock input of the storage means,
  D. a second signal path from the source of the encoded signal through the exclusive-OR gate to the clock input of the storage means, and
  E. a third signal path from the source of the encoded signal to the data input of the storage means,
wherein
  a. the time for a signal to propagate along the first signal path is at least as long as the minimum pulse width required to clock the storage means, and
  b. wherein the difference between the time for a signal to propagate along the second signal path and the time for a signal to propagate along the third signal path is at least as long as said predetermined time interval, and
  c. the output signal from the exclusive-OR gate comprises a signal which has exactly one pulse for each data bit.

* * * * *